Dec. 17, 1935.   J. R. HUGHES   2,024,289
VEHICLE CONSTRUCTION
Filed July 3, 1935
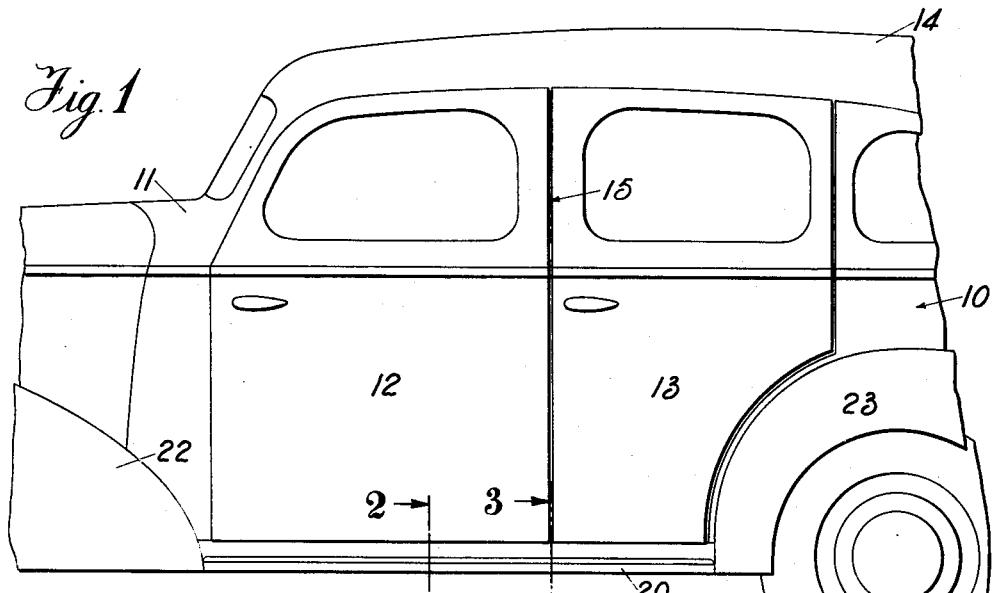
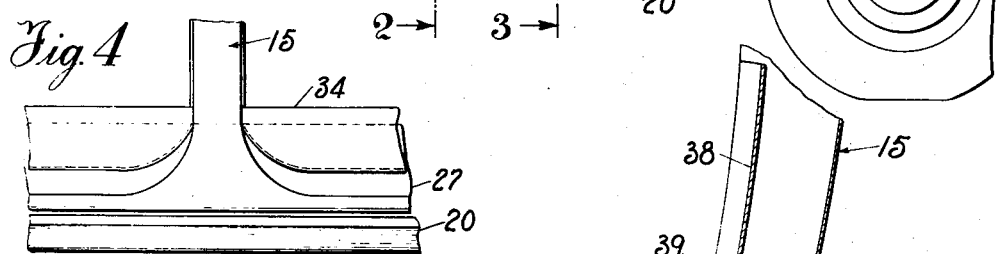
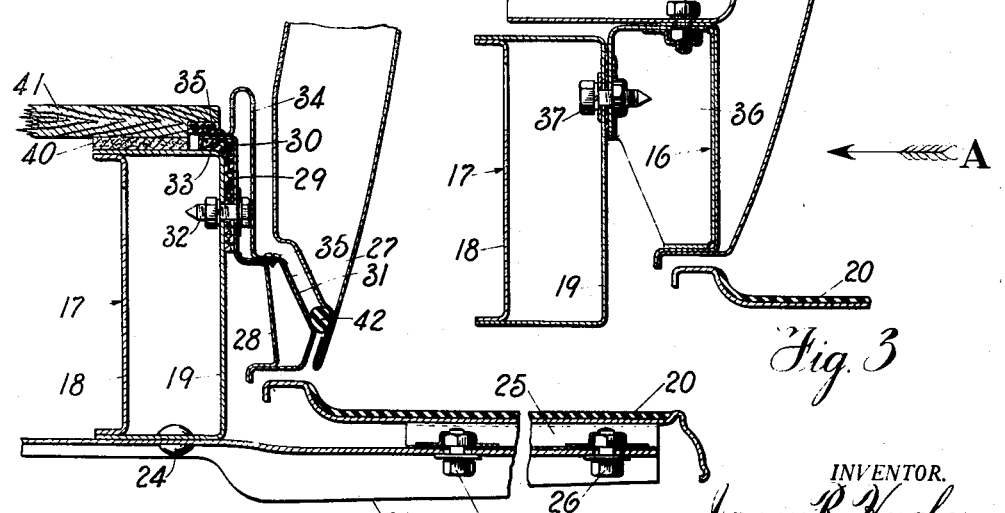
INVENTOR.
James R Hughes
BY P. W. Pomeroy
ATTORNEYS.

Patented Dec. 17, 1935

2,024,289

UNITED STATES PATENT OFFICE 2,024,289

VEHICLE CONSTRUCTION

James R. Hughes, South Bend, Ind., assignor to The Studebaker Corporation, South Bend, Ind., a corporation of Delaware Application July 3, 1935, Serial No. 29,602

5 Claims. (Cl. 296—28)

This invention relates to automotive vehicle constructions and especially to the mounting of the vehicle body onto the chassis frame in a manner so that the overall height of the vehicle will be lower than the height of similar vehicles in which the body frame is mounted on top of the chassis frame.

One of the primary objects of my invention is to provide a body construction which comprises vertical pillars which merge at their bottoms with sills that are box-shaped in cross section intermediate the pillars, the pillar and sills being maintained in spaced relation to the chassis frame.

Another object is to provide a body construction in which the scuff plates therefor are externally concealed by the doors forming a part of the body.

Still another object is to provide a body construction in which the sills therefor are externally concealed by the doors forming a part of the body construction.

A further object is to provide a body construction in which the sills have flange portions attached to the chassis frame members and portions box-shaped in cross section maintained in spaced relation to the chassis frame members.

Other objects, and objects relating to details of construction and methods of manufacture will be apparent from the drawing and the detailed description to follow:

The accompanying drawing illustrates an acceptable embodiment of the idea of my invention, however, the drawing is only for the purpose of illustration and not as limiting the scope thereof as it will be obvious to those skilled in the art that changes and modifications can be made in the construction shown and described without departing from the spirit and substance of the invention, the scope of which is to be measured entirely by the sub-joined claims.

In the drawing in which like numerals refer to like parts throughout the several views:

Fig. 1 is a side elevation of the automotive vehicle including a body mounted thereon in accordance with my invention.

Fig. 2 is an enlarged detailed sectional view taken on the line 2—2 of Fig. 1, illustrating a preferred method of attaching the body sill to the chassis frame intermediate the body pillars.

Fig. 3 is a sectional view taken on the line 3—3 of Fig. 1, illustrating the body pillar and the method of attaching the body sill to the chassis frame at that point.

Fig. 4 is a fragmentary elevational view looking in the direction of the arrow A of Fig. 3, illustrating a portion of the body sill and pillar.

Referring to the accompanying drawing, the numeral 10 indicates generally the body of an automotive vehicle. The body may comprise a cowl 11, front doors 12, rear doors 13, roof 14, body pillars indicated generally by the numeral 15, and sills also indicated generally by the numeral 16. Although I have only shown a side elevation of the vehicle and have illustrated only one body sill and chassis side frame member it will be understood that these and other structural parts may be of the same construction on both sides of the vehicle so that it has not been thought necessary to duplicate the respective parts.

The chassis frame side member, indicated generally by the numeral 17, comprises two channel shaped members 18 and 19 nested together so that the ends of the top and bottom flanges of both members are in alignment and are secured together by welding or other suitable means to form a box-shaped structure.

There is a running board 20 positioned on each side of the vehicle which is secured to the corresponding side frame member 17 by brackets 21 and which has attached thereto the front and rear fenders 22 and 23. Each bracket 21 is riveted at 24 to the bottom flange of the frame member 19 or in otherwise suitably secured thereto and is secured to a U shaped bracket 25 on the bottom face of the running board 20 by the bolts 26. The running board construction and the method of attaching it to the chassis frame may, if desired, be like that shown in my Patent No. 1,982,105 issued November 27, 1934, except that in the present construction I prefer not to attach it to the body sill but instead have spaced it therefrom.

The body sill 16 comprises a member 27 having a channel-shaped portion 28 therein intermediate the body pillars, a vertical flange 29 and an inwardly directed flange 30 overlying the top flange of the chassis frame member 19 and a second member 31 channel-shaped in cross section having its top and bottom flanges overlying and suitably secured to the top and bottom flanges of the channel-shaped portion 28 of the member 27. The channel-shaped portion 28 of member 27 and the channel-shaped member 31 are arranged to provide a sill portion which is box-shaped intermediate the body pillars as is clearly shown in Fig. 2. The member 31 is formed to extend upwardly and form a part of the body pillars 15, as is best shown in Fig. 4, so that the pillar 15 and the body sill 16 are an integral unit.

The flange 28 of the body sill member 27 and the chassis frame member 18 are perforated to receive bolts 32 for securely clamping the body sill to the chassis frame intermediate the body pillars, there preferably being anti-squeak material 33 interposed between the chassis frame and the sill to prevent any possible rubbing between the respective members and thus eliminate noises which might otherwise occur. After the body sill 16 is attached to the chassis frame 17, as previously described, a scuff plate 34 is attached to the sill member 27 by the screws 35 as is clearly shown in Fig. 2. I also provide brackets 36 which are suitably secured to the body sill 27 at the pillars to form further attaching means so that the body sill is secured to the chassis frame 17 by the bolts 37 and the bracket 38 forming a part of the pillar structure is attached to the sill 16 by the bolts 39.

Anti-squeak material 40 is placed on the chassis frame members and floor boards 41 are supported directly thereby, the ends being notched to fit over the inwardly directed flange on the scuff plate 34. The doors 12 and 13 conceal the scuff plate 34 and the body sill 16 when the doors are in closed position and are each provided with a sealing strip 42 which presses against the body sill members 31 to seal the opening between the sill and door and thus prevent air and moisture from coming up into the body between the sill and door.

It will thus be seen that I have provided a body construction which permits the lowering of the over-all heighth of the vehicle as distinguished from several of the bodies now on the market as the floor boards are supported directly on the chassis frame members and the body sills are secured to the chassis frame members along the outer faces thereof and along the door openings so that a very rigid construction is provided. The box-shaped portions of the sill members which extend beneath the bolts that attach the sills to the chassis frame are spaced from the chassis frame members along their entire length so as to prevent rubbing between the respective members along the bottom edges thus eliminating squeaks and rattles which have heretofore been present in vehicles which include the so-called body drop frame constructions. Also the body pillars are formed to provide an integral part of the body sills in a manner so that the respective parts are rigidly united and thus weaving sideways of the body relative to the chassis frame is largely eliminated.

Although I have shown one mechanical embodiment of my invention, well understood by those in the art, that various changes in details of construction, shapes of the parts, and method of manufacture may be resorted to without departing from the scope and substance of my invention which is limited only by the claims herein.

What I claim is:

1. A vehicle construction comprising a chassis frame having side members, and body sills having box-shaped portion supported by and secured to said side members above said box-shaped portions, said box-shaped portions being spaced from said side members.

2. A vehicle construction comprising a chassis frame having a side member, a body sill comprising a member having a channel-shaped portion, a flange extending upwardly therefrom, and a flange overlying said side member, and a second channel-shaped member overlying said first channel-shaped portion to provide a box-shaped sill and means to secure said upwardly extending flange to said side member, said box-shaped sill being spaced from said side member.

3. A vehicle construction comprising a chassis frame having a side member, a body sill comprising a member having a channel-shaped portion, a flange extending upwardly therefrom, and a flange overlying said side member, and a second channel-shaped member overlying said first channel-shaped portion to provide a box-shaped sill, said sill being spaced from said side member, means to secure said upwardly extending flange to said side member, and a scuff plate secured to said second channel-shaped member, concealing said upwardly extending flange.

4. A vehicle construction comprising a chassis frame having a side member, a body sill comprising a member having a channel-shaped portion, a flange extending upwardly therefrom, and a flange overlying said side member, and a second channel-shaped member overlying said first channel-shaped portion to provide a box-shaped sill, said sill being spaced from said side member, means to secure said upwardly extending flange to said side member, and a body pillar extending upwardly from and integrally formed with said second channel-shaped member.

5. A vehicle construction comprising a chassis frame having a side member, a body sill comprising a member having a channel-shaped portion, a flange extending upwardly therefrom, and a flange overlying said side member, and a second channel-shaped member overlying said first channel-shaped portion to provide a box-shaped sill, said sill being spaced from said side member, means to secure said upwardly extending flange to said side member, a body pillar extending upwardly from and integrally formed with said second channel-shaped member; and additional means for securing said sill to said side member at said body pillar.

JAMES R. HUGHES.